Oct. 8, 1935.　　　F. A. PARSONS　　　2,016,555
MACHINE TOOL
Filed Oct. 10, 1928　　　4 Sheets-Sheet 1

INVENTOR
Fred A Parsons

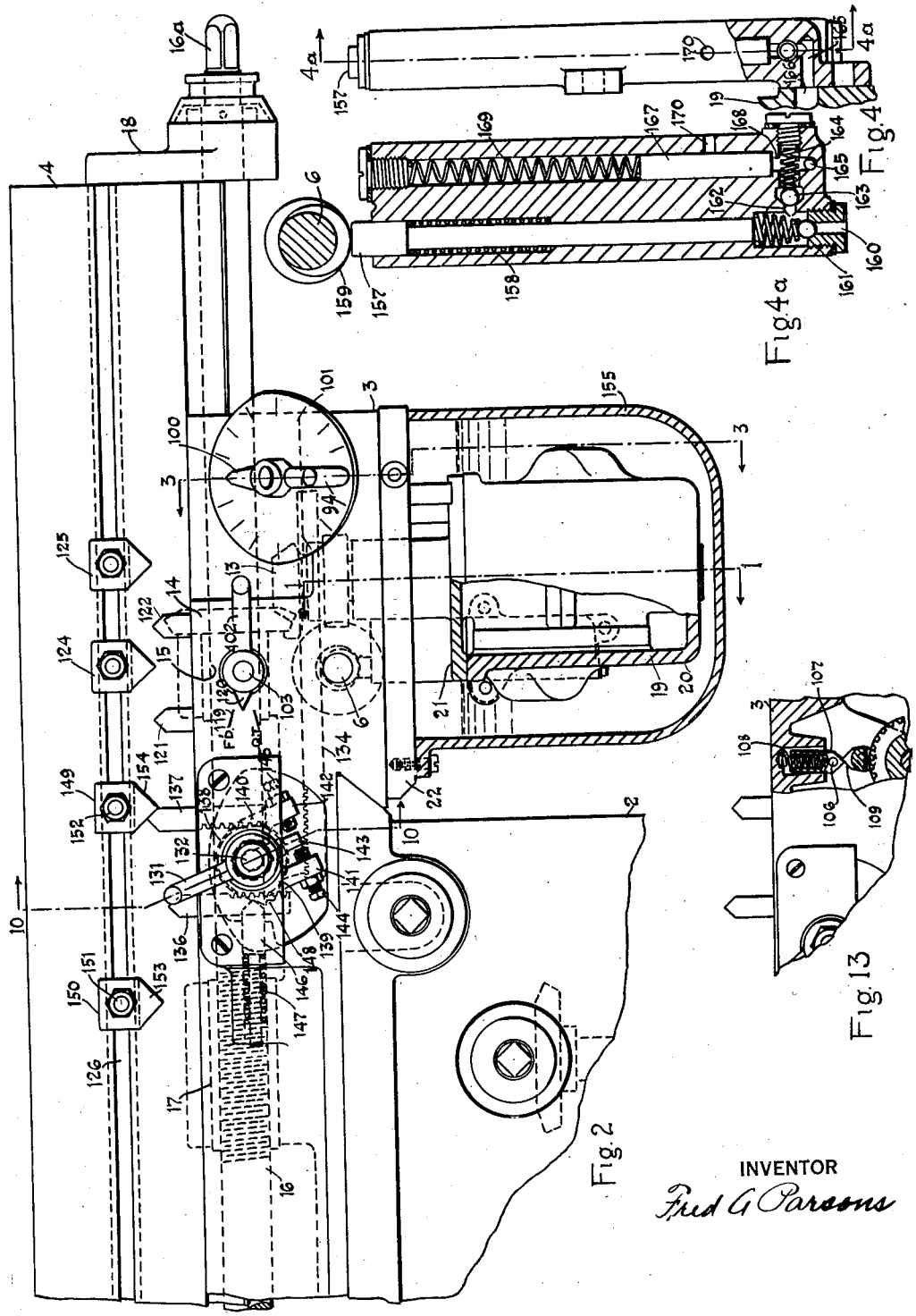

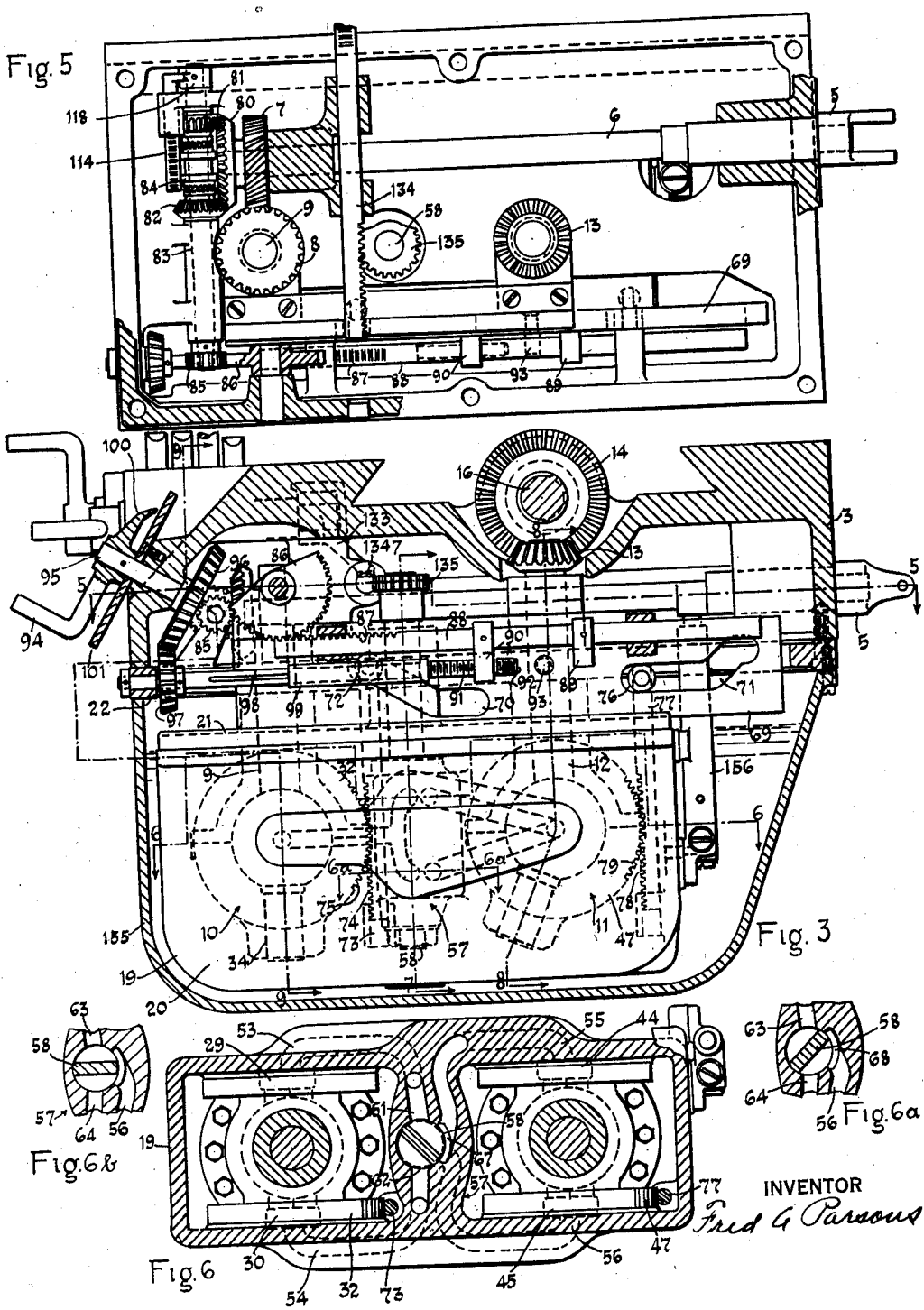

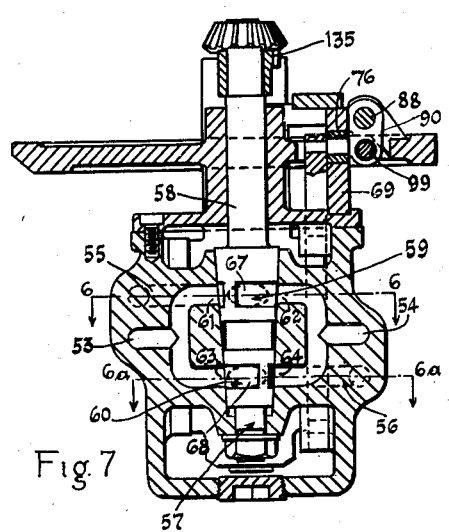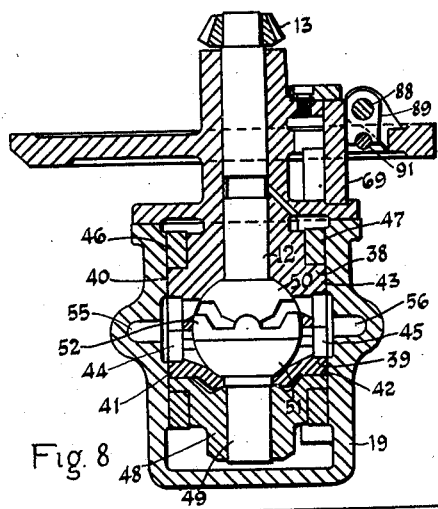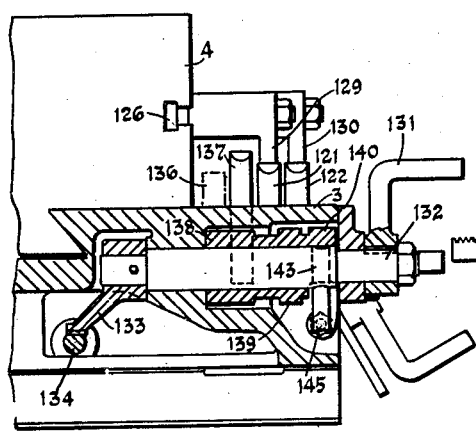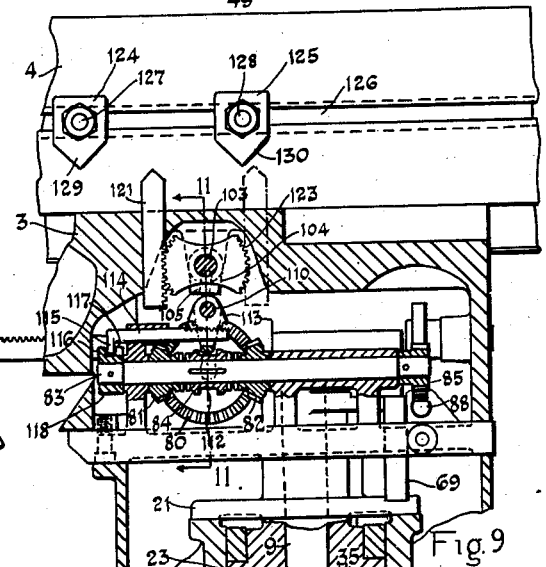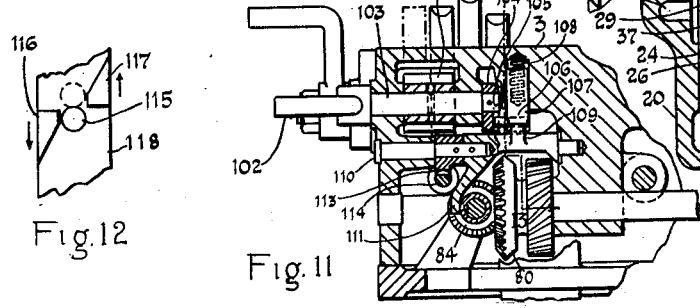

Patented Oct. 8, 1935

2,016,555

UNITED STATES PATENT OFFICE 2,016,555

MACHINE TOOL

Fred A. Parsons, Milwaukee, Wis., assignor to Kearney & Trecker Corporation, West Allis, Wis.

Application October 10, 1928, Serial No. 311,444

58 Claims. (Cl. 90—21.5)

This invention relates to machine tools and more particularly to transmission and control mechanism therefor.

The general purpose of the invention is to improve and simplify the construction and operation of such transmission and control mechanism.

A further purpose is to provide a transmission mechanism which is in part mechanical and in part hydraulic, and so combined as to retain certain advantages of each type while providing other advantages not possible with either type alone.

A further purpose is to provide an improved transmission including an hydraulic type of rate changer and improved control mechanism therefor.

A further purpose is to provide improved transmission and control mechanism whereby a machine tool support may be traversed at a variety of rates of feed, or at a rapid traverse rate, and in either direction at either rate, and may be manually or automatically controlled whereby to change the rate or direction of support movement at desired points in the travel thereof.

Other objects will be apparent from the disclosure.

The invention consists of the construction and combination of parts herein illustrated, described and claimed, and in such modifications of the particular form of mechanism illustrated and described as may be equivalent to that claimed.

In the drawings, the same reference characters have been used to indicate the same parts in each of the views, of which:

Fig. 2 is a front elevation of a portion of the same machine partly in section.

Fig. 3 is a partial section taken on line 3—3 of Fig. 2.

Fig. 4 is an enlarged view partly in section of a pump shown in Figs. 1-2-3.

Fig. 4A is a vertical section of the same pump taken on line 4a—4a of Fig. 4.

Fig. 5 is a partial horizontal section taken on line 5—5 of Fig. 3.

Fig. 6 is a partial horizontal section taken on line 6—6 of Fig. 3 and also Fig. 7.

Fig. 6A is a partial horizontal section taken on line 6A—6A of Fig. 3 and also Fig. 7.

Fig. 6B shows the above section with valve in neutral position.

Fig. 7 is a partial vertical section along line 7—7 of Fig. 3.

Fig. 8 is a partial vertical section along line 8—8 of Fig. 3.

Fig. 9 is a partial vertical section along line 9—9 of Fig. 3.

Fig. 10 is a partial vertical section along line 10—10 of Fig. 2.

Fig. 11 is a partial vertical section taken on line 11—11 of Fig. 9.

Fig. 12 is an enlarged view of a detail shown also in Figs. 5 and 11.

Fig. 13 is a partial vertical section taken on line 13—13 of Fig. 11.

Figures 1, 14:
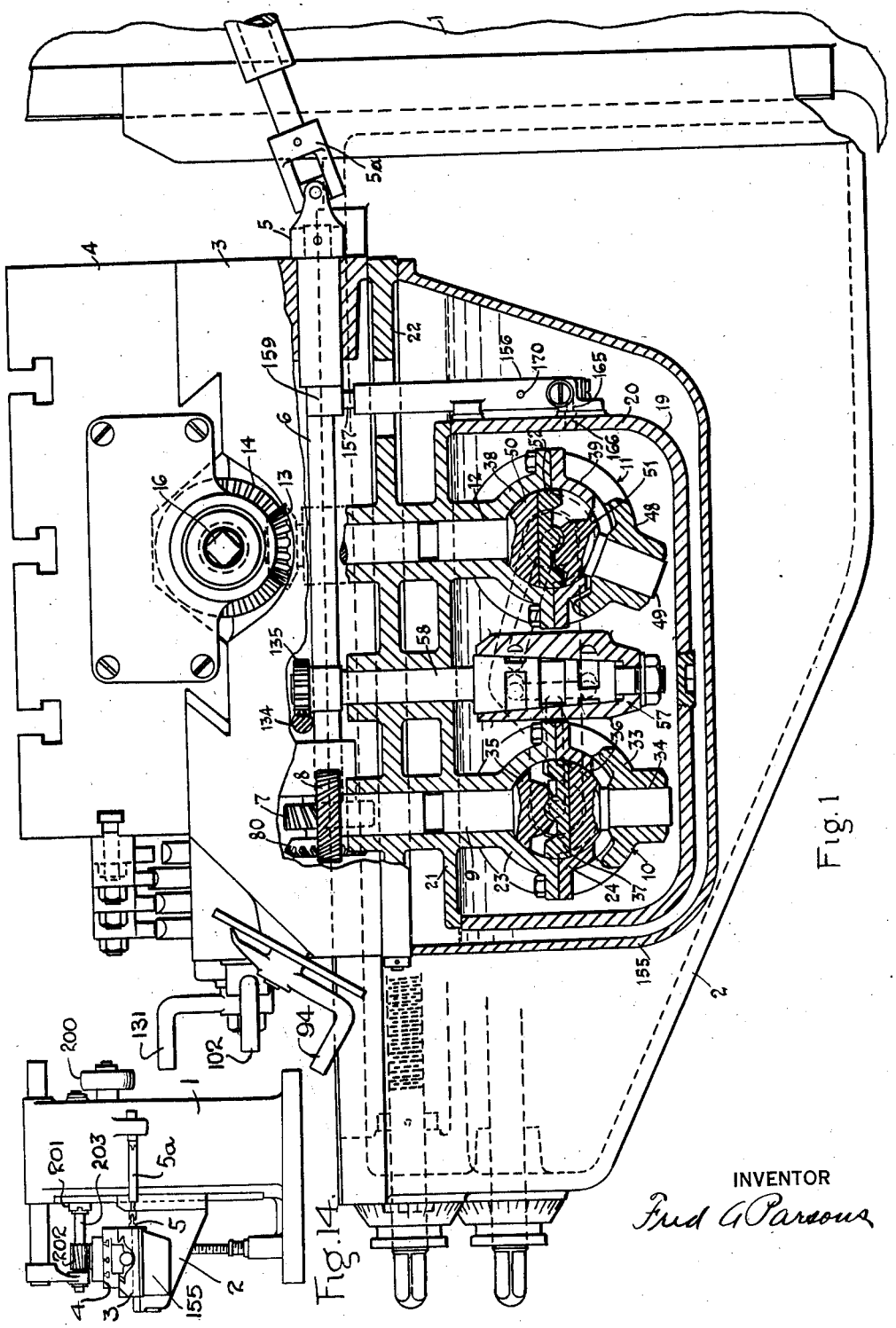
Fig. 1 is a right hand side elevation of a portion of a machine tool of the type known as a knee and column milling machine partly in section along line 1—1 of Fig. 2 and which includes the invention.
Fig. 14 is a small scale right side elevation of the milling machine of which a portion is shown in larger scale in Fig. 1.

The milling machine includes a stationary column or support 1 Figs. 1-14, a knee or support 2 guided on the column for vertical movement relative thereto, a saddle or support 3 guided on knee 2 for cross movement toward and from the column, and a table or work support 4 guided on saddle 3 for longitudinal movement to right or left in Fig. 2. The slides or guides for the movement of the various supports may be of any suitable form and will therefore not be described. Suitable means for the movement of knee 2 and saddle 3 are provided, but such means will not be described since they may be of any desired well known form, or may be similar to the means later described for the table movement.

The machine includes a power source, such as a pulley 200 associated with column 1 which drives a member 5 fixed on a shaft 6 journaled for bodily movement with saddle 3. Member 5 is preferably driven at a constant speed through a train permitting movement relative to column 1, which for such purpose may include an extensible universal joint shaft 5A which is driven from pulley 200 by any suitable mechanism, and acts as a drive member for the mechanism later described in any position of knee 2 and saddle 3.

The milling machine ordinarily includes a rotatable tool spindle 201 journaled in column 1 and driven from pulley 200 by any suitable transmission and which may be used to drive a rotary cutter 202 fixed on an arbor 203 which in turn is fixed with spindle 201.

The above described mechanism provides for the movement of table relative to spindle 201 in three mutually transverse paths.

Fixed on shaft 6 is a helical gear 7, Figs. 1-5, meshed with a gear 8 fixed on the drive shaft 9 of a pump generally denoted by the numeral 10. Figs. 1-3. Pump 10 drives a rotary hydraulic motor generally denoted by the numeral 11, Figs. 1-3, on the driven shaft 12 of which is fixed a bevel gear 13 meshing with a bevel gear 14 journaled in saddle 3, and having an axial bore 15, Fig. 2, through which a table screw 16 is slidably splined. Table screw 16 is in threaded engagement with a nut 17, Fig. 2 fixed with saddle 3 and is journaled at each end in brackets fixed with the table, of which one is shown at 18, Fig. 2. The screw moves axially when rotated and is journaled to carry the table along with its axial movement in the usual manner.

The hydraulic pump 10 may be of any suitable form, but as here shown is of a construction similar to that fully shown and described in the United States Patent 1,678,050, issued July 24, 1928 and will therefore be only briefly described. A substantially closed casing 19, Figs. 1-2-3, includes a lower portion 20 and a cover plate 21 upon which the lower portion is removably fixed. The cover plate 21 is fixed with a plate member 22 removably fixed on saddle 3. A pump housing member 23, Figs. 1-9, fixed with cover 21 extends within the casing and removably fixed therewith is a pump housing member 24. Portions 25—26—27—28 of the housing members form trunnions through which ports or passages 29—30 respectively open into opposite sides of a spherical chamber formed within the housing members 23—24 and having the sphere center coincident with the axis of shaft 9. The trunnions mentioned support ring members 31—32 fixed with a member 33 whereby rings 31—32 and member 33 form a unit supported and guided for movement about an axis passing through the center of the spherical chamber and at right angles to the axis of shaft 9.

Journaled in member 33 is a shaft 34 having its axis at right angles to the trunnion axis about which member 33 moves and passing through the center of the spherical chamber in any position of member 33. Fixed on shafts 9 and 34 respectively are members 35—36. An intermediate member 37 is pivoted both with member 35 and member 36, the respective pivots being at right angles to one another and each passing through the center of the spherical chamber. Member 35 driven from shaft 9, drives the intermediate member 37 which in turn drives member 36 and shaft 34 and the arrangement is such as to form four separate substantially closed chambers within the spherical chamber each of which is alternately expanded and contracted during each revolution of the parts if member 24 is positioned for the axis of shaft 34 to stand at an angle with the axis of shaft 9. The amount of volume change in each such chamber during a revolution is proportional to the angle between the axis of shafts 9—34, being zero when the shafts are aligned. The position and form of ports 29—30 and of the various parts is such that the several chambers each rotate to maintain communication with the one port during expansion and with the other port during contraction whereby fluid supplied to one port will be forcibly expelled from the other thus creating a positive flow of fluid through the pump. Although a pump such as described will change its direction of flow as the position of shaft 34 is shifted to the one side or the other of the axis of shaft 9 in the present instance the pump is never reversed, other reversing means being provided as will be described. The pump is however, adjusted to regulate its flow and for such purpose means will be later described.

The motor 11 is of a construction and operation similar to the pump construction just described. Motor 11 also stands within the substantially closed casing 19 and has housing members 38—39, Figs. 1-8, the portions 40—41—42—43 of which form trunnions through which ports 44—45 open into opposite sides of a spherical chamber formed in the housing. Ring members 46—47 are guided on the trunnions and have fixed therewith a member 48 which journals a shaft 49. Fixed on the driven shaft 12 is a member 50 and fixed on shaft 49 is a member 51. Between members 50 and 51 a member 52 is pivoted. Four chambers are formed within the spherical housing and each alternately expanding and contracting as the parts are rotated, the change in volume during rotation being determined by the angular position of shaft 49 relative to shaft 12. It is obvious that the construction described will operate as a rotary motor if fluid under pressure is applied to one of the ports, and the speed of rotation will be determined in part by the amount of fluid supplied and in part by the angular position of shaft 49. The motor 11 is connected to be operated from pump 10 by the means of closed fluid channels as will be later described, and since both the pump 10 and motor 11 are adjustable as to volume of fluid displaced during a given revolution, the speed of the driven shaft 12 at a constant speed of driving shaft 9, will be determined in part by the pump adjustment and in part by the motor adjustment.

The construction of pump 10 and motor 11 is such that either might be adjusted to reverse the direction of driven shaft 12 while maintaining a constant direction of driving shaft 9, but in this instance other means for such reversal is preferred and will be later described.

Channels previously mentioned, connecting pump 10 and motor 11 are as follows. The ports 29—30 of pump 10 respectively register with the ends of closed channels 53—54, Figs. 6-7, in the casing 19. The ports 44—45 of motor 11 respectively register with the ends of closed channels 55—56 in casing 19. The pump channels communicate with the motor channels through a reversing valve generally denoted by the numeral 57, Figs. 1-7. Valve 57 has a rotatable stem 58 cut away to provide channels on opposite sides as shown in Fig. 6, at an upper point generally denoted by the numeral 59 in Fig. 7 and as shown in Fig. 6A at a lower point generally denoted by the numeral 60 in Fig. 7. The pump passages 53—54 respectively terminate in openings 61—62 adjacent the upper point 59 and in openings 63—64 adjacent the lower point 60. Motor channels 55—56 respectively terminate in openings 67—68 respectively adjacent the upper point 59 and the lower point 60. The form and arrangement is such that in one position of valve stem 58, as shown in Figs. 6-6A, the pump port 29 communicates with motor port 44, and pump port 30 with motor port 45, while in a position in which the valve stem 58 is turned one quarter revolution from that shown in Figs. 6-6A, the pump port 29 communicates with motor port 45 and pump port 30 with motor port 44. Thus the valve 57 constitutes a reverser and according to the position thereof motor 11 will be actuated in the one or the other direction. The openings 67 and 68 and the cut away portions of the valve stem 58 are so proportioned that in a central position shown in Fig. 6B of the valve stem the pump fluid is by-passed whereby the pump does not move the motor, the reverser thus providing a means for starting and stopping the motor while pump 10 continues to rotate, and also providing means operable to disconnect the table to permit manual movement thereof, which may be effected by the means of a suitable crank, not shown, applied to a squared end 16a of the table screw 16.

It will be seen that in the transmission described variations of table rate may be effected by adjustment of pump 10 or of motor 11 or of both, and the table may be stopped or reversed by means of valve 57, all while maintaining a constant drive rate for the transmission. A power device is provided for adjusting the pump or motor whereby to change the table rate, such device being controlled either manually or from the movement of the table as follows:

A cam plate or member 69, Figs. 3–5–7–8–9 is guided to be shifted to right or left in Fig. 3 and provides cam grooves 70–71 respectively for shifting the pump 10 and motor 11. For shifting pump 10 a cam follower roll 72 engaging cam groove 70 is pivoted on a plunger 73, Figs. 3–6, having rack teeth 74 engaging gear teeth 75 cut on the periphery of the ring member 32. For shifting motor 11 a cam follower roll 76 engaging cam groove 71 is pivoted on a plunger 77, Figs. 3–6 having rack teeth 78 engaging gear teeth 79 cut on the periphery of ring member 41. The cam plate 69 may be shifted by the following power device. Fixed on shaft 6 is a bevel gear 80, Figs. 1–5–9–11, engaging oppositely running bevel gears 81–82 each rotatable on a shaft 83 to which either gear 81–82 may be clutched by the means of a shiftable clutch member 84 keyed with shaft 83 and having suitable clutch teeth on the respective end faces thereof adapted for engagement with complementary clutch on the end faces of gears 81–82 in accordance with the direction in which member 84 is moved. When shifted into engagement with either gear 81–82 the clutch member 84 and shaft 83 make approximately one revolution and are then disengaged by means later described. The shaft 83 has fixed thereon a gear 85 meshed with a segment 86, Figs. 3–5–9, which meshes with suitable rack teeth 87 on a shiftable rod 88. Rod 88 carries with it in its shifting movement a plurality of abutments one of which 89 is fixed thereon, and the other of which is adjustable and consists of a member 90 fixed on the rod and a screw member 91 threaded in member 90 for axial adjustment and having an end abutment portion 92.

The adjustable screw end portion 91 and the member 89 are adapted to contact with an abutment pin 93 fixed with cam plate 69 respectively during opposite movement of rod 88. When the clutch member 84 is engaged with a suitable one of the gears 81–82, the rod 88 is shifted to the left in Fig. 3, by an amount corresponding to one revolution of shaft 83, and abutment 89 contacts abutment 93 to move cam plate 69 to a left hand position in Fig. 3, which is always the same for a left hand shift. When clutch member 84 is engaged with the other of gears 81–82 the rod 88 is shifted to the right in Fig. 3 by an amount also corresponding to one revolution of shaft 83, and abutment 92 contacts abutment 93 to move cam plate 69 to a right hand position in Fig. 3, which may vary in accordance with the adjustment of abutment 92. The cam grooves 70–71 are so formed and positioned that the left hand shift mentioned above invariably adjusts pump 10 to a position of maximum volume or displacement and simultaneously adjusts motor 11 to a position of minimum volume or displacement, such condition resulting in a maximum speed of the driven shaft 12, corresponding to the speed desired to drive table 4 at a quick traverse or non-cutting rate. During the left hand movement described above, the form and position of the cam grooves 70–71 is such as to shift motor 11 to a position of maximum displacement or volume during a first part of the cam plate movement, during which pump 10 is not appreciably adjusted and remains therefore in the position of maximum volume.

The abutment 92 may be so adjusted that the cam plate moves no farther than that in which case the parts are left in such position, the pump and motor being of such relative proportion that such maximum pump and maximum motor positions result in a rate of driven shaft 12 which corresponds to the speed desired to drive table 4 at a maximum feed or cutting rate. Abutment 92 may also be adjusted to move cam plate 69 during the described right hand movement of rod 88 any desired further amount up to its full movement corresponding to the entire movement of rod 88, and cam groove 70 is so proportioned and positioned that if such full movement is completed pump 10 will have been moved to a position of minimum displacement, the motor meanwhile having remained in the position of maximum displacement and the result being to drive the shaft 12 at a rate corresponding to the desired minimum feed or cutting rate of table.

It will be seen from the above that a shift of rod 88 in the one direction results in a constant quick traverse setting of the transmission while the opposite shift results in a feed setting which may vary between maximum and minimum feed according to the adjustment of abutment 92.

Abutment 92 may be adjusted to give a predetermined rate of feed by the means of a hand lever 94, Figs. 1–2–3 for positioning the abutment by the means of a shaft 95, Fig. 3, on which lever 94 is fixed, a gear 96 also fixed on shaft 95 and engaging a pinion 97 fixed on a shaft 98 in slidable splined relation and axially coinciding with a sleeve portion 99 fixed with screw 91, shaft 98 being prevented from axial movement but permitting the movement of screw 91 when rod 88 is shifted. The hand lever 94 is provided with an indicating portion 100 movable therewith and relative to a graduated dial member 101, the dial preferably having graduations corresponding to resulting feed in inches per minute against which the indicating pointer may be positioned to give any desired feed, either exactly matching the graduations or in intermediate positions resulting in any desired intermediate feed.

The power shift for positioning the transmission in quick traverse position is controlled manually or automatically. Manual control is by the means of a hand lever 102, Figs. 2–11, fixed on a shaft 103, upon which is fixed a lever 104 having a slot 105 engaging a projection 106 fixed on a detent plunger 107 continuously pressed by a spring 108 against a detent cam 109 fixed on a shaft 110.

Upon shaft 110 is also fixed a lever 111 extended to engage an annular groove 112 in the shiftable clutch member 84. Also fixed on shaft 110 is a segment 113 engaging suitable rack teeth in a shiftable rod 114 having an abutment 115 at one end and positioned to be contacted by the one or the other of cam portions or abutments 116—117 on a member 118 fixed on shaft 83.

The plunger 107 has a certain amount of side motion in its retaining socket, sufficient that it may be shifted by the means of lever 102 and the parts described to the one side or the other of the point of detent cam 109, see Fig. 13.

When shifted in either direction, immediately after the plunger point passes the cam point the parts react for spring 108 to quickly engage clutch member 84 in the corresponding direction. Shaft 83 is then driven in the corresponding direction of rotation for substantially one revolution, after which one or the other of cam abutments 116—117 reacts against abutment 115 to force rod 114 and lever 111 back to a central position disengaging the clutch member 84. During such time and thereafter until manually moved in the opposite direction hand lever 102 is retained in its manually determined position by spring 108 reacting through cam 109 to retain plunger 107 against the one side of its socket, but although the detent plunger and cam continue to urge clutch member 84 in the direction from which it has just disengaged, it cannot again engage in that direction until after an opposite engagement because the abutment 115 is resting against the abutment 116 or 117 which has just forced the disengagement. But when hand lever 102 is moved oppositely to its previous movement, the point of plunger 107 moves past the point of cam 109 to urge the opposite engagement of clutch member 84 and the cycle is repeated for opposite movement of shaft 83.

Thus the movement of shaft 83 and the pump and motor shifting device previously described is limited to alternate cycles in opposite directions and the mechanism shown is such that the position of hand lever 102 invariably indicates the previous movement, that is to say the lever visibly indicates by its position whether the table transmission is in a position for a feed, or for a quick traverse, and suitable lettering or graduations are fixed adjacent the lever 102 at 119 to cooperate with an indicator or pointer 120, movable with the lever.

For automatically controlling the power shift to feed or quick traverse there are provided the trip plungers 121—122 adjacent the edge of the table 4 but differently distant therefrom, and each having suitable rack teeth for engaging the opposite sides respectively of a pinion 123 fixed on shaft 103. Dogs 124—125, Fig. 9, adjustably fixed on table 4 by the means of a T slot 126 and T bolts 127—128 have cam portions 129—130 respectively moving in different paths of travel corresponding to the different positions of the respective plungers 121—122. In either direction of table travel one of the dogs may contact the one plunger to force shaft 103 in the one direction or the other dog may contact the other plunger to force the shaft in the other direction, to selectively control at any desired point in the travel of table 4 the positioning of the table transmission for feed or quick traverse.

The reverse and motion interrupting valve 57 is controlled manually or automatically. Manual control is by the means of a hand lever 131, Figs. 1-2-10, fixed on a shaft 132 upon which is also fixed a segment 133 engaging suitable rack teeth in a rod 134 which also has suitable rack teeth engaging a segment 135, Figs. 5-3-7-10, fixed on the stem 58 of the valve, whereby the valve may be moved in either direction for a corresponding direction of table movement, or may be centrally positioned to stop the table.

The valve 57 may be automatically controlled by the means of table dogs. For such result there are provided trip plungers 136—137 adjacent the edge of the table but differently distant therefrom and each differently positioned than the feed or quick traverse plungers 121—122 as shown in Fig. 10. Plungers 136—137 each have suitable rack teeth engaging a gear 138, Figs. 2-10, supported on shaft 132 for oscillation relative thereto, the plungers engaging the gear respectively on its opposite peripheral sides. Fixed with gear 138 is a detent cam 139 and a member 140 providing arms 141—142 spaced on opposite sides of a pin or abutment 143 fixed with shaft 132. Arms 141—142 carry adjustable abutment screws 144—145 respectively which may be adjusted for the supported parts to move in exact accordance with the movement of shaft 132, or for a predetermined lost motion in either direction. The detent cam 139 is acted upon by a cam plunger 146, Fig. 2, pressed by a spring 147 and provides a central notch 148. In the absence of lost motion between the screws 144—145 and abutment 143 the point of plunger 146 engages the central notch when valve 57 is centrally positioned to stop the table, and yieldingly retains the parts in such stop position. The one or the other trip plunger 136—137 may be contacted during table movement by dogs 149—150 adjustably fixed on the table by the means of the T slot 126 and T bolts 151—152 and having cam portions 153—154 respectively moving in different paths of travel corresponding to the different positions of the respective plungers.

During movement of table 4 to the left in Fig. 2 the arrangement of the parts is such that plunger 137 must be up and plunger 136 down. The dog 149 may then be suitably positioned for the cam portion 154 to contact and move plunger 137 downwardly thereby moving shaft 132 through screw 145 and abutment 143. If there is no lost motion between such screw and the abutment the central notch 148 of detent cam 139 arrives at a position to be engaged by plunger 146 simultaneously with the arrival of valve 57 to the central position, whereupon the table stops and the parts are retained in such position by the detent until moved therefrom by the hand lever 131. If however screw 145 has been adjusted to provide a suitable amount of lost motion then the cam 139 moves relatively ahead of valve 57 and central notch 148 has passed by the plunger 146 before the valve arrives at a position where the table stops. In such case, immediately after the central notch passes the plunger, the plunger and cam react to quickly throw the valve into a position for opposite table movement, and the table then moves to the right in Fig. 2. In the table movement to the right, the plunger 136 is up and dog 150 may be suitably positioned for the cam portion 153 to strike the plunger. In such case the action is similar to that previously described except the shaft 132 is moved through screw 144 contacting the abutment 143. If the screw is adjusted for no lost motion in this direction of movement, the valve 57 is positioned centrally at the same time that plunger 146 engages the central notch 148 and the table stops. If lost motion is provided by the adjustment of screw 144 then the central notch 148 passes plunger 146 before the valve arrives at a central position, and the table movement is reversed.

Thus in either direction of table movement the table may be either automatically stopped at a desired point or caused to automatically reverse.

The reverse and rate change dogs shown in Fig. 2 may obviously be fixed in any desired relative positions including such positions that either or both rate change dogs are operative during a given direction of table movement. Either or both dogs 124—125 may be pivoted to be operative in only one direction of table movement but since such pivoted construction is old and well known it is not here shown.

Both pump 10 and motor 11 are subjected to fluid pressures tending to cause leakage at any points where fluid might be forced from the pressure chambers. To reduce such leakage the pump and motor are enclosed by the casing 19 and cover 21 forming a chamber surrounding the pump and motor and completely filled with fluid and from which there are no openings where fluid may escape except the points where shafts 9—12 enter, and the points where the control rods 73—77 enter. These parts are closely fitted, but a certain amount of fluid may pass. To continuously maintain the fluid to completely fill the pump and motor passages, and the chamber formed by casing 19 there is provided a reservoir of surplus fluid adapted to receive the leakage mentioned and a pump continuously operating to force fluid from the reservoir into the chamber formed by casing 19. A casing 155 provides such a reservoir positioned to receive the leakage mentioned, and removably supported from plate 22 on saddle 3 in a manner to provide a cover for the mechanism described but removable for access thereto. Fixed to casing 19 in position for the intake opening to be submerged in fluid when casing 155 is in place is a pump generally denoted by the numeral 156, Figs. 1–3. The pump 156 may be of any suitable type to deliver fluid under heavy pressure to within the casing 19, but in this instance is constructed as follows. A plunger 157, Figs. 1–4–4A is alternately pushed in one direction by a spring 158 and in the other direction by an eccentric 159 fixed on the shaft 6. During the one direction of stroke fluid is drawn from the body of fluid within casing 155 through an opening 160 to pass a spring valve 161 which prevents its return. In the other stroke direction such fluid is forced out through an opening 162 to pass a spring valve 163 which prevents its return, and into a chamber 164 which includes a passage 165 registering with a passage 166 into the chamber within casing 19. A relief valve is provided consisting of a spring pressed plunger 167, Fig. 4A, against which fluid from chamber 164 presses through an opening 168.

The plunger spring 169 being proportioned for a suitable pressure within casing 19, will yield when the volume of pump 156 exceeds the amount necessary to maintain such pressure and the plunger will move back to permit escape of fluid through an opening 170. The movement of plunger 167 provides in effect an accumulation of capacity sufficient to maintain the pressure in the chamber of casing 19 during the suction stroke of plunger 157. Fluid thus forced into the chamber within casing 19 supplies the internal passages of pump 10 and motor 12 through the relatively small spaces or clearance between the parts relatively movable for the adjustment of pump and motor displacement. The pressure set up by the pump 156 should preferably be somewhat in excess of the maximum pressure set up within the hydraulic transmission, but by the construction described the fluid leakage from the hydraulic portion of the table transmission is maintained at very low value, whereby pump 156 requires very little power for its operation even under considerable pressure.

It is contemplated that means preventing damage to the transmission in the case of table overload will be provided. Such means may be a mechanical device in the mechanical portion of the train or a valve within the hydraulic system to by-pass the pump fluid when the motor resistance exceeds a predetermined maximum, but since each of such devices are well known in various forms and are not necessary to machine operation, and not claimed as part of this invention, they are not shown.

It is to be noted that the table screw 16 and its nut 17, Fig. 2, form a portion of a mechanical train between the motor 11 and the table or work support 4 which is adapted to freely transmit power from the motor to the support but is self-locking against transmission of power or movement in the opposite direction. Thus the table is prevented from movement except by power from the motor end of such train. Even when the reverser valve 57 is in the central or by-pass position, the table is rigidly restrained against undesired movement, although it may still be moved manually from the squared end of the table screw.

What is claimed is:

1. In a machine tool, the combination of a transmission having a portion alternatively adjustable to different positions respectively operable for different effects, a shifter having alternative forward and reverse movements and connected for the respective movements to adjust said portion to different of said positions thereof, a power train connected with said shifter and including a reverser having forward and reverse positions for correspondingly actuating said train, a controller selectively operative to shift said reverser to either of said positions, and power means automatically operative after either movement of said reverser to shift said reverser to another position interrupting said train.

2. In a transmission and control mechanism for machine tools, the combination of a transmission having a member alternatively adjustable to different positions, mechanism for movement of said member including a power train having a reverser, detent means adjustable to different positions respectively urging said reverser to the one or the other of different positions respectively determinative of different directions of movement of said train, a controller manually movable to different positions respectively adjusting said detent means to different of said positions thereof whereby to correspondingly move said reverser, and power means for thereafter moving said reverser to a motion interrupting position, said controller and said power means being operative for the position of said controller until it is manually moved invariably to indicate the last previous position of said reverser whereby to invariably indicate the resulting position of said member.

3. In a transmission and control mechanism for machine tools, the combination of a power train including a reverser shiftable to a plurality of positions respectively for forward and reverse effects and to a motion interrupting position, detent means alternatively adjustable for shifting said reverser to one or the other of said plurality of positions and including a portion movable with said reverser and another portion not so movable, power means for subsequently shifting said reverser to said motion interrupting position, and a manual controller for said detent mechanism and connected with said other portion thereof, whereby said power means and the position thereof until it is manually moved invariably corresponds to the last previous position of said reverser.

4. In a milling machine, the combination of a rotatably movable tool support and a work support bodily movable adjacent said tool support in a direction transverse to the axis thereof, a transmission for one of said movements including a drive element, a fluid pump, a fluid operated motor and said support in the order recited, said pump and motor each being adjustable for the purpose of altering the rate of movement of said support, and control mechanism for adjusting said pump and motor including a power train, an element driven therefrom and connected for adjustment both with said pump and motor, and manual means controlling said train.

5. In a machine tool the combination of a movable support, a transmission therefor including a drive member, a fluid pump, a fluid operated motor and said support in the order recited, said pump and motor each being adjustable in two directions respectively for increasing and for decreasing the rate of movement of said support, a shifter movable in opposite directions respectively for the one direction to adjust both said pump and motor in a direction increasing the rate of support movement and for the other directon to adjust both said pump and motor in a direction to decrease such rate, a power train, and control mechanism for selectively connecting said power train to actuate said shifter in either of said directions.

6. In a machine tool the combination of a movable support, transmission mechanism therefor including a fluid pump and a motor actuated thereby, said pump and motor each being adjustable whereby to selectively actuate said support at a quick traverse rate or at a feed rate, a shifter movable in opposite directions respectively to adjust both said pump and motor to positions productive of different of said rates, a power train reversibly connectible with said shifter, and a control device movable in opposite directions respectively adjusting the connection of said power train to move said shifter in different of said directions.

7. In a machine tool the combination of a movable support, a transmission therefor including a fluid pump and a motor actuated thereby, said pump and motor each being adjustable whereby to selectively actuate said support at a fast or slow rate, a shifter movable in different directions respectively to adjust both said pump and motor to positions productive of different of said rates, a power train reversibly connectible with said shifter, and control mechanism including a trip element movable to effect a predetermined connection of said train and shifter, a dog movable to actuate said trip element during movement of said support, and power means operable to interrupt said connection of said power train.

8. In a machine tool the combination of a movable support, a transmission therefor including a fluid pump and a motor actuated thereby, said pump and motor each being adjustable whereby to selectively actuate said support at a fast or slow rate, a shifting device having different portions respectively operative to adjust said pump and motor, said device being movable in different directions respectively to adjust both said pump and motor to positions productive of different of said rates, said portions being relatively adjustable to alter the ratio of said rates.

9. In a machine tool the combination of a movable support, a transmission therefor including a fluid pump and a motor actuated thereby, said pump and motor each being adjustable whereby to selectively actuate said support at a fast or slow rate, a shifting device having different portions respectively operative to adjust said pump and motor, said device being movable in different directions respectively to adjust both said pump and motor to positions productive of different of said rates, and a power train reversibly connectible with said portion of said shifting device, said portions being relatively adjustable to alter the ratio of said rates.

10. In a machine tool the combination of a movable support, a transmission therefor including a fluid pump device, and a motor device actuated thereby, one of said devices being adjustable for the purpose of providing different rates for said support, a shifter movable in different directions respectively for movement of said adjustable device for different of said rates, and having different portions respectively determinative of the different rates, and a power train reversibly connectible with said shifter, said shifter portions being relatively adjustable to alter at least one of said rates.

11. In a machine tool the combination of a movable support, a transmission therefor including a fluid pump device and a motor device actuated thereby, one of said devices being adjustable for the purpose of actuating said support at different rates, a shifter movable in different directions respectively for movement of said adjustable device for different of said rates, and having different portions respectively determinative of the different rates, said portions being relatively adjustable to alter the ratio of said rates, a power train reversibly connectible with said shifter, a trip device having movement in different directions respectively for the one or the other connection of said power train, and a dog adapted to shift said trip device during movement of said support.

12. In a machine tool the combination of a movable support, a transmission therefor and adjustable to a fast position and to a variety of slow positions, a shifter having a portion adjustable to a variety of positions respectively preselective of different of said slow positions and in one direction to adjust said transmission to said fast position unaffected by the adjustment of said portion and movable in the other direction to adjust said transmission to one of said slow positions in accordance with the adjustment of said portion, a power train reversibly connectible with said shifter, a trip member movable in different directions respectively determinative of the different connections of said power train, and a dog adapted during support movement to move said trip member.

13. In a machine tool the combination of a movable support, a transmission therefor and adjustable to change the rate thereof, a shifter movable in different directions respectively for different portions thereof to adjust said transmission to increase or decrease said rate, said shifter portions being relatively adjustable to change the ratio of said rates, a power train connectible with said shifter for movement thereof in the one or the other of said directions, and means controlling the connection of said power train and determinative of the direction of shifter movement resulting therefrom.

14. In a machine tool the combination of a movable support, a transmission therefor and adjustable to change the rate thereof, a shifter movable in different directions respectively for different portions thereof to adjust said transmission, said portions being relatively adjustable to change the ratio of the rates effected thereby, a power train connectible with said shifter for movement thereof in either of said directions, a trip member movable to connect said power train for shifter movement in either direction, and dogs adapted during support movement to move said trip member, said dogs being determinative of the direction of movement of said shifter.

15. In a milling machine the combination of a base, a tool spindle supported from said base for rotative movement, a work support supported from said base for movement in a path transverse to the spindle axis, and a transmission for one of said movements including a fluid pump and a motor actuated therefrom, said pump and motor each being adjustable for the purpose of changing the rate of said transmission, said transmission including a reversing valve positioned in said transmission at a point between said pump and motor for the purpose of changing the direction of said motor while maintaining a uni-directional actuation of said pump.

16. In a machine tool the combination of a movable support, a transmission therefor including a portion adjustable for determining the rate of support movement, a selective device adjustable to predetermine the adjustment of said portion, a shifter movable subsequently to the adjustment of said device to effect the transmission adjustment selected by said device, a power train connectible with said shifter, a trip member movable to connect said power train, and a dog movable to contact and move said member during movement of said support.

17. In a milling machine, the combination of a base, a tool spindle member rotatably supported from said base, a work support member supported from said base for reciprocation in a path transverse to the axis of said spindle, a transmission for movement of one of said members including a power source, a pump driven from said source, and a reversibly operable fluid motor driven from said pump, said transmission including shiftable motor reversing means, and rate change means for said motor, and control means for said transmission including a shifter for said rate change means and a power train operable from said source exclusive of said motor and of said reversing means and connectible for actuation of said shifter, and means controlling the connection of said train with said shifter.

18. In a milling machine the combination of a rotatable tool spindle, a work support reciprocable in a path transverse to the axis of said spindle, a power source, a transmission driven from said source for movement of said support including a power operable pump, a reversibly operable fluid motor and shiftable motor reversing means, a device adjustable to alternative positions respectively for causing a slow or fast rate of said motor, power means driven from said source to exclude said pump and alternatively connectible to adjust said device to the one or the other of said positions, trip means alternatively movable in different directions respectively for effecting the one or the other connection of said power means, and a dog movable to move said trip means in one of said directions during movement of said support in a given direction, whereby to automatically change the rate of support movement during its movement in said given direction.

19. In a milling machine, the combination of a rotatable tool spindle, a work support reciprocable in a path transverse to the axis of said spindle, a transmission for said support including a reversibly operable fluid motor, a pump and shiftable motor reversing means, a power operable device shiftable to different positions respectively for causing a fast or a slow rate of said motor and having different portions relatively adjustable whereby to change the relative ratio of said rates, and a plurality of control members respectively separately operable for the shifting of said motor reversing means, and for shifting said power operable device.

20. In a milling machine, the combination of a rotatable tool spindle, a work support reciprocable in a path transverse to the axis of said spindle, a transmission for said support including a reversibly operable fluid motor, a pump and shiftable motor reversing means, means associated with said transmission and adjustable for changing the rate of said motor, mechanism operable in one direction to adjust said rate change means to a position productive of a fast motor rate and in the other direction to adjust said rate change means to one of a variety of feed rate positions, a device associated with said mechanism and adjustable to selectively predetermine said one of the feed positions of said rate change means, power means for alternatively operating said mechanism in the one or the other of said directions, and individually operable control means respectively for the shifting of said motor reversing means and for the adjustment of said device and for controlling said power means to operate said mechanism.

21. In a milling machine the combination of a rotatable tool spindle, a work support movable in a path transverse to the axis of said spindle, a transmission for said support including a fluid pump and a motor actuated therefrom, said pump and motor each being adjustable to selectively actuate said support at a feed rate or at a rapid traverse rate, a shifter movable in different directions respectively to adjust both said pump and said motor to positions productive of different of said rates, a power train for movement of said shifter to either of said positions, and means selectively controlling said power train to effect the one or the other of said shifter positions.

22. In a milling machine, the combination of a base, a knee supported from said base for vertical movement, a horizontally movable work table supported from said knee, a rotatably movable tool spindle positioned at a level above said table and axially transverse to the path of table movement, a spindle supporting column uprising from said base adjacent a longitudinal edge of said table and at one side of a vertical plane passing through said edge, a transmission for one of said movements driven at a substantially constant rate and operable for a variety of rates including a fast rate, a relatively slow rate, and a plurality of intermediate rates, said transmission including a rate changer adjustable to a variety of positions respectively determinative of different of said rates; and control mechanism for said transmission including a shifter operable to adjust said rate changer out of any of said positions of rate changer adjustment into any other thereof, a selector movable separately with respect to said shifter and in advance of operation of said shifter to various positions respectively determinative upon subsequent operation of said shifter of different of said positions of rate changer adjustment, said selector being movable irrespective of the position of rate changer adjustment and including a portion supported for vertical bodily movement with said knee and exposed for manual operation at the other side of said vertical plane, a chart having markings respectively representing different of said rates, and indicating means movable relative to said chart in accordance with the movement of said selector, whereby to visibly indicate on said chart the result which will be effected upon operation of said shifter.

23. In a milling machine, the combination of a base, a knee supported from said base for vertical movement, a horizontally movable work table supported from said knee, a rotatably movable tool spindle positioned at a level above said table and axially transverse to the path of table movement, a spindle supporting column uprising from said base adjacent a longitudinal edge of said table and at one side of a vertical plane passing through said edge, a transmission for one of said movements driven at a substantially constant rate and operable for a variety of rates including a fast rate, a relatively slow rate, and a plurality of intermediate rates, said transmission including a rate changer adjustable to a variety of positions collectively determinative of all of said rates and respectively determinative of different of said rates; and control mechanism for said transmission including a shifter operable to adjust said rate changer out of any of said positions of adjustment into any other thereof, a selector movable separately with respect to said shifter and in advance of the operation of said shifter into various positions respectively determinative upon subsequent operation of said shifter of different of said rate changer positions, said selector including a portion vertically bodily movable with said knee and exposed for manual operation at the other side of said vertical plane, a power train connectible to operate said shifting means, a hand lever for effecting said connection of said power train, a chart having markings respectively representing different of said rates, and indicating means movable relative to said chart in accordance with the movement of said selector, whereby to visibly indicate on said chart the result which will be effected upon operation of said hand lever.

24. In a milling machine, the combination of a support, a tool spindle rotatably supported from said support, a work table supported from said support for bodily reciprocatory movement in a path transverse to the axis of said spindle, said support including a spindle carrying portion uprising adjacent a longitudinal edge of said table and at one side of a vertical plane passing through said edge, transmission mechanism for said reciprocatory table movement driven at a substantially constant rate and operable for a variety of rates including a fast rate, a relatively slow rate, and a plurality of intermediate rates, said transmission including a rate changer adjustable into various positions respectively determinative of different of said rates and a reverser for changing the direction of table movement; and control mechanism for said transmission including a member supported from said support and operable for operation of said reverser, said member including a manually operable portion exposed for operation at the other side of said vertical plane, power means for adjustment of said rate changer into any of said various positions thereof, means controlling operation of said power means for selective determination of one or another of said positions of adjustment of said rate changer and including a selective device carried by said support, said selective device having a portion exposed for manual operation at said other side of said vertical plane, a chart having markings respectively representing different of said rates, indicating means movable relative to said chart, and means for effecting said relative movement in accordance with the adjustment of said means controlling said power means, whereby to visibly indicate on said chart the result of the operation of said power means.

25. In a milling machine, the combination of a base, a knee supported from said base for vertical movement, a horizontally movable work table supported from said knee, a rotatably movable tool spindle positioned at a level above said table and axially transverse to the path of table movement, a spindle supporting column uprising from said base adjacent a longitudinal edge of said table and at one side of a vertical plane passing through said edge, a power transmission for said work table movement and alternatively operable for a quick traverse rate or for one of various relatively slow feed rates including a fast rate, a relatively slow rate, and a plurality of intermediate rates, said transmission including a rate changer adjustable into various positions respectively determinative of different of said feed rates; and control mechanism for said transmission including means controlling said alternative feed or quick traverse operation of said transmission, said means including a portion vertically bodily movable with said knee and exposed for operation at the other side of said vertical plane, a power device operable for adjustment of said rate changer into any of said various positions thereof, means controlling the operation of said power device for selective determination of one or another of said various positions of rate changer adjustment and including a portion vertically movable with said knee and exposed for manual operation at said other side of said vertical plane, and means visibly indicating the particular feed rate effected when said means controlling alternative feed or quick traverse is operated to effect a feed rate.

26. In a milling machine, the combination of a rotatable tool spindle, a work table movable adjacent said spindle in a path transverse to the axis thereof, transmission mechanism for said table and alternatively operable for a quick traverse rate or for one of various relatively slow feed rates, said feed rates including a fast rate, a relatively slow rate, and a plurality of intermediate rates, said transmission including a rate changer adjustable into various positions respectively determinative of different of said feed rates; and control mechanism for said transmission including a trip mechanism operable for controlling said alternative operation of said transmission, a trip dog for operation of said trip mechanism in accordance with the movement of said work table, a power device operable for adjustment of said rate changer into any of said various positions thereof and driven from said source to exclude said rate changer, means controlling the operation of said power device for selective determination of one or another of said positions of adjustment of said rate changer, and means visibly indicating the particular feed rate effected when said trip mechanism is operated for effecting a feed rate.

27. In a milling machine, the combination of a support, a tool spindle rotatably supported from said support, a work table supported from said support for bodily reciprocatory movement in a path transverse to the axis of said spindle, said support including a spindle carrying portion uprising adjacent a longitudinal edge of said table and at one side of a vertical plane passing through said edge, a transmission for said reciprocatory table movement and alternatively operable for a quick traverse rate or one of a variety of relatively slow feed rates, said feed rates including a fast rate, a relatively slow rate, and a plurality of intermediate rates, said transmission including a fluid pump device driven from said source and a fluid motor device driven from said pump, one of said devices being adjustable into various positions respectively for different of said feed rates, said transmission also including means for reversing the direction of table movement; and control means for said transmission including a member supported from said support and operable for operation of said reverser means, a member operable for controlling said alternative feed or quick traverse operation of said transmission, each of said members including a portion exposed for manual operation at the other side of said vertical plane, power means for adjustment of said adjustable device into any of said various positions thereof, means controlling said power means for selectively determining a preferred position of adjustment of said adjustable device and having a portion exposed for manual operation at said other side of said vertical plane, and means visibly indicating the particular feed rate effected upon operation of said member controlling alternative feed or quick traverse when operated to effect a feed.

28. In a milling machine, the combination of a rotatably movable tool support, a support bodily movable adjacent said tool support in a direction transverse to the axis thereof, a transmission driven at a substantially constant rate for one of said movements and operable for a variety of rates including a fast rate, a relatively slow rate, and a plurality of intermediate rates, said transmission including reversing means and a fluid pump device and a fluid motor device driven from said pump, one of said devices being adjustable into various positions respectively for different of said rates; and control mechanism for said transmission including power means for adjustment of said adjustable device into any of said various positions, means controlling said power means for selectively determining a preferred position of adjustment of said adjustable device, means controlling said reversing means and operable independently of the last mentioned control means, a chart having markings respectively representing different of said rates, and indicating means movable relative to said chart in accordance with the operation of said power means, whereby to visibly indicate on said chart the result of the operation of said control mechanism.

29. In a milling machine, the combination of a rotatably movable tool support, a support bodily movable adjacent said tool support in a direction transverse to the axis thereof, a transmission driven at a substantially constant rate for one of said movements and operable for a variety of rates including a fast rate, a relatively slow rate, and a plurality of intermediate rates, said transmission including a rate changer and a reverser, said rate changer being adjustable into various positions respectively determinative of different of said rates; and a control mechanism for said transmission including means for shifting said reverser and power means driven from said transmission exclusive of said reverser and operable for adjustment of said rate changer into any of said various positions of adjustment thereof, said control mechanism including rate selective means controlling said power means for selectively determining one or another of said positions of rate changer adjustment and operable independently of said reverser shifting means, a chart having markings respectively representing different of said rates, and means movable relative to said chart for visibly indicating the result of the operation of said control mechanism.

30. In a milling machine, the combination of a rotatably movable tool support, a support bodily movable adjacent said tool support in a direction transverse to the axis threof, a transmission driven at a substantially constant rate for one of said movements and including a fluid pump device, a fluid operable motor device connected for operation from said pump and a shaft rotatably driven from said motor, one of said devices being adjustable to various positions respectively determinative of different rate effects, said transmission also including other rate change means in serial motion transmitting relation with said adjustable device and adjustable to different positions, one of said positions of adjustment of said other rate change means being operable in combination with the various positions of adjustment of said adjustable device to determine various rates of revolution of said shaft corresponding in number to said different rate effects of said adjustable device; and control mechanism for said transmission including a shifter movable for effecting any of a plurality of said positions of adjustment of said other rate change means including the last mentioned position thereof, and for effecting any of said various positions of adjustment of said adjustable device in combination with said last mentioned position whereby to render effective any of said various rates of shaft revolution, said control mechanism including means selective of which of said various positions of said adjustable device will be effected upon operation of said shifter whereby to determine a desired rate of said shaft, said selective means including a chart having markings representing different rates and indicating means relatively movable adjacent said chart in accordance with the operation of said control mechanism.

31. In a milling machine, the combination of a rotatably movable tool support, a support bodily movable adjacent said tool support in a direction transverse to the axis thereof, a transmission driven at a substantially constant rate for one of said movements and including a fluid pump device, a fluid operable motor device connected for operation from said pump and a shaft rotatably driven from said motor, one of said devices being adjustable to various positions respectively determinative of different rate effects, said transmission also including other rate change means in serial motion transmitting relation with said adjustable device and adjustable to different positions, one of said positions of adjustment of said other rate change means being operable in combination with the various positions of adjustment of said adjustable device to determine various rates of revolution of said shaft corresponding in number to said different rate effects of said adjustable device; and control mechanism for said transmission including a power operable shifter for effecting any of a plurality of said positions of adjustment of said other rate change means including the last mentioned position thereof, and for effecting any of said various positions of adjustment of said adjustable device in combination with said last mentioned position whereby to effect said various rate of said shaft revolution, and a power train for operation of said shifter and driven from said transmission to exclude said shaft, said control mechanism including means selective of which of said various positions of said adjustable device will be effected upon operation of said shifter whereby to determine a desired rate of said shaft, said selective means including a chart having markings representing different rates and indicating means relatively movable adjacent said chart in accordance with the operation of said control mechanism.

32. In a milling machine, the combination of a horizontally movable work table, a supporting structure therefor, a rotatably movable tool spindle at a level above said table and axially transverse to the path of table movement, said structure providing a spindle supporting portion uprising adjacent a longitudinal edge of said table and at one side of a vertical plane passing through said edge, a transmission for movement of said work support including in the order recited a pump device, a fluid operable rotatable motor device, relatively rotatable screw and nut means and said work support, one of said devices being adjustable to various positions respectively productive of different rates of movement of said work support, said transmission also including a reverser adjustable independently of said device to a plurality of positions respectively productive of different directions of work support movement; and control mechanism for said transmission including means for adjustment of said adjustable device and independently operable means for adjustment of said reverser, each of said adjusting means including a portion exposed for manual operation at the other side of said vertical plane, a chart having markings respectively representing different of said rates of support movement, and indicating means movable relative to said chart in accordance with the operation of the first mentioned adjusting means.

33. In a metal cutting machine the combination of a base, a tool and a work support each supported from said base for relative movement for metal cutting, a power source, a transmission for said movement including a reversibly operable fluid motor and a pump adapted to supply fluid thereto, and driven from said source, a device shiftable in opposite directions respectively for increasing and for decreasing the rate of said motor irrespective of the direction of motor operation, a power train driven from said source independently of said motor and connectible to actuate said device selectively in either direction, and control means including an element shiftable in opposite directions respectively to connect said power train to effect the different directions of movement of said device.

34. In a metal cutting machine the combination of a base, a tool and a work support each supported from said base for relative movement for metal cutting, a power source, a transmission for said movement including a fluid operable motor and a pump adapted to supply fluid thereto, and driven from said source, and control means for said transmission including a rate selecting device adjustable to predetermine one of a variety of cutting rates of said motor, a power train driven from said source independently of said motor and connectible to effect the motor rate predetermined by said device, and means operable independently of said rate selecting device and controlling said connection of said power train.

35. In a metal cutting machine the combination of a base, a tool and a work support each supported from said base for relative movement for metal cutting, a power source, a transmission for said movement including a fluid operable motor and a pump adapted to supply fluid thereto, and driven from said source, a rate selecting device manually movable to preselect one of a variety of cutting rates of said motor, a power train driven from said source independently of said transmission and connectible to effect the motor rate preselected by said device, and a trip for rendering said power means effective, said trip including a dog movable in accordance with said relative movement.

36. In a metal cutting machine the combination of a base, a tool and a work support each supported from said base for relative metal cutting movement, a power source, a transmission for said movement including a fluid operable motor and a pump adapted to supply fluid thereto, a device adjustable to alternative positions respectively for causing a relatively slow rate of said motor and for causing a relatively fast rate thereof, and a train driven from said power source independently of said transmission and alternatively connectible to adjust said device to the one or the other of said positions.

37. In a machine tool the combination of a base, a tool and a work support each supported from said base for relative metal cutting movement, a power source, a transmission therefor including a fluid operable motor and a pump adapted to supply fluid thereto, and driven from said source, a device adjustable to alternative positions respectively for causing a relatively slow rate of said motor or for causing a relatively fast rate thereof, a train driven from said power source to exclude said motor and alternatively connectible to adjust said device to the one or the other of said positions, trip means alternatively movable in different directions respectively for effecting the one or the other connection of said power means, and a dog movable in accordance with said relative movement to move said trip means in one of said directions during movement of said support.

38. In a machine tool the combination of a base, a tool and a work support each supported from said base for relative metal cutting movement, a power source, a transmission for said movement including a fluid operable motor and a pump adapted to supply fluid thereto and driven from said source, said pump being adjustable to one position for causing a quick traverse rate of fluid delivery to said motor and to a variety of other positions respectively determinative of different feed rates thereof, a device adjustable to selectively predetermine one of said other positions of pump adjustment, mechanism movable in one direction to effect said quick traverse position of said pump and in the other direction to effect the one of said other positions predetermined by said device, and a power train driven from said source exclusive of said transmission and selectively connectible to effect the one or the other direction of movement of said mechanism.

39. In a machine tool the combination of a base, a tool and a work support each supported from said base for relative metal cutting movement, a power source, a transmission for said movement including a fluid operable motor and a pump adapted to supply fluid thereto and driven from said source, said pump being adjustable to one position for causing a quick traverse rate of fluid delivery to said motor and to a variety of other positions respectively determinative of different feed rates thereof, a device adjustable to selectively predetermine one of said other positions of pump adjustment, mechanism alternatively movable in different directions respectively to adjust said pump to said quick traverse position independently of the position of said device, or to the one of said other positions determined by the position of said device, a power train driven from said source independently of said motor and selectively connectible to effect the different directions of movement of said mechanism, and means controlling the connection of said power train in accordance with said relative metal cutting movement.

40. In a machine tool, the combination of a transmission having a member alternatively shiftable to different positions, a power train having a reverser shiftable to different positions respectively to connect said train to shift said member to the one or the other position, detent means continuously resiliently urging said reverser to the one or the other of different positions respectively determinative of movement of said member to the different positions, means normally preventing said detent means from shifting said reverser, a controller adapted to render the last mentioned means inoperative and selectively movable to cause said detent means to shift said reverser to the one or the other of said reverser positions, and power means thereafter automatically operative to shift said reverser from the last mentioned position effected by said detent means to another position interrupting the connection of said train.

41. In a machine tool, the combination of a transmission having a member alternatively shiftable to different positions, a power train having a reverser shiftable to different positions respectively to connect said train to shift said member to the one or the other position, detent means resiliently urging said reverser to the one or the other of the different reverser positions, means normally preventing said detent means from shifting said reverser, a controller adapted to render the last mentioned means inoperative and selectively movable to cause said detent means to shift said reverser to the one or the other reverser position, and power means thereafter automatically operative to shift the reverser from the last mentioned position effected by said detent means to another position interrupting the connection of said train; said means normally preventing the detent means from shifting the reverser including means preventing operation of said detent except to shift said reverser alternately to different of the train connecting positions thereof.

42. In a milling machine, the combination of a transmission including a power source and a member to be rotated thereby, said transmission including means adjustable for determining various rates of rotation of said rotatable member relative to said power source, a device adjustable for preselecting a predetermined value of said relative rates of rotation which will be effected upon the subsequent adjustment of said adjustable means, and a secondary power transmission connectible for adjustment of said adjustable means including clutch means shiftable to determine when such adjustment shall be effected.

43. In a milling machine, the combination of a column, a rotatable tool support, a reciprocable work support mounted on said column for bodily vertical movement, a member rotatable for actuating one of said supports, a power source, a transmission connectible between said source and member and including means adjustable for determining various rates of rotation of said member relative to said source, a device adjustable for selectively determining one of said various rates of member rotation, a secondary transmission connectible for adjustment of said adjustable means, and control means for said device including a manually operable portion carried by said column and bodily vertically movable with said work support.

44. In a milling machine, the combination of a rotatable tool support, a reciprocable work support, a transmission for actuation of one of said supports including a power source and means adjustable for establishing a plurality of rates of the actuated support relative to said source, a secondary transmission, adjusting means for said adjustable means and operable from said secondary transmission, manual control means for selectively timing the effect of said secondary transmission on said adjusting means, and a rate indicating device associated with said adjustable means and adjusting means to indicate the rate effected upon operation thereof.

45. In a milling machine, the combination of a rotatable tool spindle, a work support reciprocable adjacent said spindle and in path transverse to the spindle axis, a power transmission including in the order recited, a hydraulic pump and motor means and a screw for actuation of said work support, said pump and motor means being operable for effecting a plurality of feed rates and a relatively fast quick traverse rate, said transmission also including support reversing means; and control means for said transmission including a first controller operable for controlling said pump and motor means to alternatively effect said quick traverse rate or one of said feed rates and a second controller operable independently of said first controller for controlling said reverser to alternatively effect the one or the other direction of work support movement.

46. In a milling machine, the combination of a rotatable tool spindle, a work support reciprocable adjacent said spindle and in path transverse to the spindle axis, a power transmission including in the order recited, a hydraulic pump and motor means and a screw for actuation of said work support, said pump and motor means being operable for effecting a plurality of feed rates and a relatively fast quick traverse rate, said transmission also including support reversing means; and control means for said transmission comprising a first controller providing a dog operable portion adjacent said table and operable for alternative selection of said quick traverse rate or of one of said feed rates of said pump and motor means, a second controller providing a dog operable portion adjacent said table and operable for alternative selection of the one or the other direction of support movement of said support reversing means, said controllers being independently operable, and dogs on said support and adapted during support movement to operate said dog operable portions.

47. In a milling machine, the combination of a rotatable tool spindle, a work table movable adjacent said spindle and in a path transverse to the axis thereof, a transmission mechanism for said work table movement and alternatively operable for a quick traverse rate or for one of various relatively slow feed rates, said feed rates including a high rate, a relatively low rate, and a plurality of intermediate rates, said transmission including a rate changer adjustable into various positions collectively determinative of all of said feed rates and respectively determinative of different of said feed rates and likewise including a reverser; and control mechanism for said transmission including means controlling said alternative operation for feed or quick traverse rate and operable independently of said reverser, a power device operable independently of said reverser for adjustment of said rate changer, means manually operable for selective determination of one or another of said various positions of rate changer adjustment effected by said power means, a chart having markings representing different of said feed rates, indicating means movable relative to said chart, and means for said relative movement and operable in accordance with operation of said means controlling operation of said power device whereby to visibly indicate on said chart the particular feed rate which will be effected when said means controlling said alternative feed or quick traverse is operated to effect a feed rate.

48. In a milling machine, the combination of a horizontally movable work table, a supporting structure therefor, a rotatably movable tool spindle at a level above said table and axially transverse to the path of table movement, said structure providing a spindle supporting portion uprising adjacent a longitudinal edge of said table at one side of a vertical plane passing through said edge, a transmission mechanism for one of said movements and operable for a variety of rates including a fast rate, a relatively slow rate, and a plurality of intermediate rates, said transmission including a rate changer adjustable into various positions respectively for effecting different of said rates and likewise including a reverser; and control mechanism for said transmission including power means operable independently of said reverser to adjust said rate changer, means manually operable for selectively determining one or another of said positions of adjustment of said rate changer effected by said power means and including a portion exposed for manual operation at the other side of said vertical plane, a chart having markings respectively representing different of said rates, and means visibly indicating on said chart the effect of the operation of said control mechanism.

49. In a milling machine, the combination of an upstanding column, a knee supported from said column for vertical movement, a horizontally movable work table supported from said knee, a rotatably movable tool spindle supported from said column at a level above said table and axially transverse to the path of table movement, said column providing a spindle supporting portion uprising adjacent a longitudinal edge of said table and at one side of a vertical plane passing through said edge, a transmission mechanism for one of said movements and operable for a variety of rates including a fast rate, a relatively slow rate, and a plurality of intermediate rates, said transmission including a rate changer adjustable to various positions respectively determinative of different of said rates and likewise including a reverser; and control mechanism for said transmission including power means operable independently of said reverser to adjust said rate changer, means manually operable for selectively determining one or another of said positions of rate changer adjustment effected by said power means and providing a portion supported for vertical movement with said knee and exposed for manual operation at the other side of said vertical plane, a chart having markings respectively representing different of said rates, and means visibly indicating on said chart the effect of the operation of said control mechanism.

50. In a milling machine, the combination of a rotatably movable tool support, a support bodily movable adjacent said tool support in a direction transverse to the axis thereof, a transmission mechanism for one of said movements and operable for a variety of rates including a fast rate, a relatively slow rate, and a plurality of intermediate rates, said transmission including a rate changer adjustable into a variety of different positions collectively productive of all of said rates and respectively determinative of different of said rates and including a reverser; and control mechanism for said transmission including a shifter operable independently of said reverser to adjust said rate changer into any of said positions of rate changer adjustment, a selector movable to various positions respectively determinative of different of said positions of rate changer adjustment and movable independently of the position of adjustment of said rate changer, a chart having markings respectively representing different of said rates, and indicating means movable relative to said chart in accordance with movement of said selector.

51. In a milling machine, the combination of a rotatably movable tool support, a support bodily movable adjacent said tool support in a direction transverse to the axis thereof, a transmission for one of said movements and operable for a variety of rates including a high rate, a relatively low rate, and a plurality of intermediate rates, said transmission including a rate changer adjustable into a variety of positions collectively determinative of all of said rates and respectively determinative of different of said rates and likewise including a reverser; and control mechanism for said transmission including a shifter operable independently of said reverser to adjust said rate changer into any of said positions of adjustment thereof, a selector movable to various positions respectively determinative of different of said positions of rate changer adjustment, a power train driven to exclude said rate changer and connectible to operate said shifter, a hand lever operable for said connection of said power train, a chart having markings respectively representing different of said rates, and indicating means movable relative to said chart in accordance with the movement of said selector.

52. In a milling machine, the combination of a rotatably movable tool support, a support bodily movable adjacent said tool support in a direction transverse to the axis thereof, a transmission for one of said movements and operable for a variety of rates including a high rate, a relatively low rate, and a plurality of intermediate rates, said transmission including a rate changer adjustable into a variety of positions respectively determinative of different of said rates and likewise including a reverser; and control mechanism for said transmission including a shifter operable independently of said reverser to adjust said rate changer into any of said positions of adjustment thereof, a selector movable to various positions respectively determinative of different of said positions of rate changer adjustment, a power train driven from said transmission to exclude said rate changer and connectible for operation of said shifter, a hand lever operable to effect said connection of said power train, a chart having markings respectively representing different of said rates, and indicating means movable relative to said chart in accordance with the movement of said selector.

53. In a milling machine, the combination of a base, a tool spindle supported from said base for rotative movement, a work table supported from said base for movement in a direction transverse to the axis of said spindle, a power source, a transmission mechanism for one of said movements including a rate changer adjustable for altering the rate of such movement and likewise including a reverser, and control means for said rate changer including a selective device adjustable to determine a selected rate of said rate changer, a shifter movable independently of said reverser to adjust said rate changer, a power train driven from said source exclusive of said rate changer and connectible with said shifter, and a manually movable member controlling the connection of said power train.

54. In a milling machine, the combination of a base, a tool spindle supported from said base for rotative movement, a work support supported from said base for movement in a direction transverse to the spindle axis, a power source, a transmission mechanism driven from said source for one of said movements and including a rate changer adjustable for a variety of different rates and likewise including a reverser, and control means for said rate changer including a device adjustable to a variety of positions respectively for different of said adjustments of said rate changer, a shifter operable independently of said reverser to effect adjustment of said rate changer in accordance with the position of adjustment of said device, a power train driven from said source and connectible for operation of said shifter, and means manually controlling said connection of said power train and shifter.

55. In a milling machine, the combination of a rotatable tool spindle, a work support adjacent thereto and reciprocable in a path transverse to the axis thereof, a transmission for reciprocation of said support and including means for alternatively effecting a quick traverse rate or one of a plurality of relatively slow feed rates, and control mechanism for said transmission providing means for adjusting said reverser, power means driven from said transmission exclusive of said reverser and operative for effecting said feed rates, said control mechanism including means for controlling said power means for selective choice of the feed rate effected thereby and including a chart having markings respectively representing different of said feed rates and an indicating means movable relative to said chart.

56. In a milling machine, the combination of a work support, a rotatable tool support, said supports being relatively bodily reciprocable, transmission means for said bodily reciprocatory movement including in the order recited a pump, a motor rotatably driven from pump and a screw and nut driven for relative rotation from said motor, said transmission also including means individually shiftable for alternatively effecting a rapid traverse rate of said reciprocatory movement or a relatively slow feed rate thereof, and means shiftable for reversal of said reciprocatory movement, and manually operable control means for shifting said shiftable means, for selectively effecting either direction of said reciprocatory movement and at either rate in one of said directions.

57. In a milling machine, the combination of a work support, a rotatable tool support, said supports being relatively bodily reciprocable, transmission means for said bodily reciprocatory movement including in the order recited a pump, a motor rotatably driven from pump and a screw and nut driven for relative rotation from said motor, said transmission including means shiftable for effecting either direction of said reciprocatory movement and for alternatively effecting in one of said directions a rapid traverse rate or a relatively slow feed rate, and control means for said transmission including separately operable controllers each connected with said shiftable means and respectively operable for determining one of said directions and for determining one of said rates.

58. In a milling machine, the combination of a work support, a rotatable tool support, said supports being relatively bodily reciprocable, transmission means for said bodily reciprocatory movement including in the order recited a pump, a motor rotatably driven from pump and a screw and nut driven for relative rotation from said motor, said transmission also including means individually shiftable for alternatively effecting a rapid traverse rate of said reciprocatory movement or a relatively slow feed rate thereof, and means shiftable for reversal of said reciprocatory movement, and control means for said transmission including separately operable controllers each having motion transmitting connection with a portion of said shiftable means and respectively operable for effecting a change in direction of said reciprocatory movement and for effecting a change in the rate thereof.

FRED A. PARSONS.